United States Patent [19]

Sawamura et al.

[11] Patent Number: 4,672,046

[45] Date of Patent: Jun. 9, 1987

[54] SINTERED ALUMINUM NITRIDE BODY

[75] Inventors: Kentaro Sawamura; Yoshio Kosaka; Masayasu Yamaguchi, all of Tokyo, Japan

[73] Assignee: TDK Corporation, Tokyo, Japan

[21] Appl. No.: 875,099

[22] Filed: Jun. 17, 1986

Related U.S. Application Data

[63] Continuation-in-part of Ser. No. 787,091, Oct. 15, 1985.

[30] Foreign Application Priority Data

Oct. 15, 1984 [JP] Japan .................................. 59-215971
Dec. 17, 1984 [JP] Japan .................................. 59-265852
Dec. 17, 1984 [JP] Japan .................................. 59-265853
Dec. 17, 1984 [JP] Japan .................................. 59-265855
Dec. 17, 1984 [JP] Japan .................................. 59-265856

[51] Int. Cl.$^4$ ............................................ C04B 35/58
[52] U.S. Cl. ......................................... 501/98; 501/96
[58] Field of Search .................................. 501/96, 98

[56] References Cited

U.S. PATENT DOCUMENTS 4,435,513  3/1984  Komeya et al. .................. 501/98 X Primary Examiner—Ferris H. Lander
Attorney, Agent, or Firm—Oblon, Fisher, Spivak, McClelland & Maier

[57] ABSTRACT

A sintered aluminum nitride body is produced by adding to aluminum nitride powder at least one sintering aid selected from the nitrides and hydrides of calcium, strontium and barium and mixtures thereof in an amount of 0.01 to 10% by weight of the aluminum nitride, molding the mixture, and sintering in a non-oxidizing atmosphere.

6 Claims, No Drawings

SINTERED ALUMINUM NITRIDE BODY

This application is a continuation-in-part of application Ser. No.: 787,091 filed on Oct. 15, 1985, pending.

BACKGROUND OF THE INVENTION

This invention relates to a sintered body of aluminum nitride.

Sintered alumina bodies have been employed as an insulating substrate for supporting integrated circuits such as silicon chips. However, alumina substrates have a poor thermal conductivity and a higher coefficient of thermal expansion than silicon, resulting in many disadvantages including the poor adhesion of large-sized silicon chips thereto.

One of substitutes for alumina is beryllium oxide, which has a thermal conductivity higher than that of alumina by a factor of ten or more. The beryllium oxide, however, is not readily available or handled because it is toxic and expensive.

Silicon carbide substrates were also developed. Production cost is undesirably increased by the use of a hot press in sintering. Also disadvantageously, silicon carbide substrates have a high dielectric constant and a low dielectric strength because silicon carbide is in itself a semiconductor.

Great attention is now paid to sintered bodies of aluminum nitride (AlN) which has a high thermal conductivity and electrical resistance. Aluminum nitride is also characterized by a coefficient of thermal expansion approximate to that of silicon and a low dielectric constant. To take advantage of these attributes, the aluminum nitride sintered bodies must be dense and low in oxygen content.

Since low oxygen content aluminum nitride powder alone can not be sintered well, there is the need for sintering aids capable of promoting sintering. A variety of sintering aids have heretofore been proposed.

For example, one known method is by adding aluminum oxide ($Al_2O_3$) or yttorium oxide ($Y_2O_3$) to aluminum nitride powder followed by sintering under ambient pressure or hot pressing. Japanese Patent Publication No. 58-49510 discloses a method for sintering aluminum nitride powder in admixture with calcium oxide (CaO), barium oxide (BaO) and/or strontium oxide (SrO) under ambient pressure. Japanese Patent Application Kokai No. 58-32073 discloses the addition of boron nitride (BN) to aluminum nitride powder. The mixture is sintered in a non-oxidizing atmosphere under ambient pressure or hot pressed. Japanese Patent Application Kokai No. 59-50077 discloses to add a powder mixture containing at least one member selected from the group consisting of CaO, BaO, and SrO to aluminum nitride powder. The mixture is then hot pressed in a non-oxidizing atmosphere.

Among these prior art techniques, the addition of oxides adversely affects thermal conductivity. The addition of boron nitride is believed favorable among others because the resulting sintered aluminum nitride bodies have a higher thermal conductivity and a higher density.

However, all these conventional sintered bodies of aluminum nitride prepared by any of the above-mentioned methods are disadvantageous in that uneven sintering is likely to occur to such an extent that white spots are sometimes observed on the surface even with the naked eyes. The uneven sintering also results in products having inconsistent electrical resistivity (volume resistivity).

In order to eliminate these disadvantages, there has long been desired to produce an improved sintered body of aluminum nitride using a novel sintering aid.

SUMMARY OF THE INVENTION

It is, therefore, an object of the present invention to provide a novel and improved sintered aluminum nitride body having characteristics suitable for an electrical insulating substrate material such as high density, thermal conductivity and electrical resistance, and uniformity in sintering, while being inexpensive and easy to sinter.

Such object can be achieved by the present invention which is directed to a sintered aluminum nitride body comprising aluminum nitride in admixture with a sintering aid. According to the invention, the sintering aid is selected from the group consisting of nitrides and hydrides of calcium, strontium and barium, and mixtures thereof.

DETAILED DESCRIPTION OF THE PREFERRED EMBODIMENTS

According to the present invention, sintered aluminum nitride bodies are produced by adding sintering aids to aluminum nitride powder before compaction and sintering.

The aluminum nitride powder may preferably be finely divided to an average particle size ranging from about 0.1 to 10 $\mu$m, and most preferably from about 0.5 to 6 $\mu$m. Also preferably, the AlN powder may have a low oxygen content or be oxygen free.

The sintering aids used herein are nitrides and hydrides of calcium, strontium and barium, and mixtures thereof. The sintering aids are described in detail.

A first group of sintering aids includes the nitrides of calcium, strontium and barium. Calcium, Strontium, and barium nitrides are represented by chemical formulas $Ca_3N_2$, $Sr_3N_2$, and $Ba_3N_2$, respectively.

A second group of sintering aids includes the hydrides of calcium, strontium and barium. Calcium, strontium, and barium hydrides are represented by chemical formulas $CaH_2$, $SrH_2$, and $BaH_2$, respectively.

These sintering aids may be used alone or in admixture of two or more.

It is found that similar compounds of magnesium such as Mg, $MgH_2$ or $Mg_3N_2$, which belongs to the alkaline earth metal group, are not effective in sintering aluminum nitride into a dense body.

The sintering aids may preferably have an average particle size in the range between 0.1 and 44 $\mu$m, and most preferably 0.5 and 20 $\mu$m. The sintering aids are added to aluminum nitride powder preferably in amounts of about 0.01 to 10%, and most preferably, about 1 to 3% by weight of the aluminum nitride. When the sintered aids are added in amounts of less than 0.01 wt % or more than 10 wt %, it is impossible to obtain a dense body by sintering under ambient pressure.

Unlike the conventional sintering aids such as oxides of alkaline earth metals and yttorium, the aids of the present invention do not contain oxygen. It is thus considered that no or substantially no impurities such as oxygen, which deteriorates thermal conductivity, are produced during sintering.

In general, sintered body of aluminum nitride is produced by first adding a powder sintering aid as stated above to aluminum nitride powder. The mixture is then molded into a compact by compression at room temperature. The compact is sintered under ambient pressure in a non-oxidizing atmosphere and then allowed to cool to room temperature.

Mixing of AlN and sintering aid powders is carried out by milling or attriting the mixture in a dry or wet system with or without a milling medium.

The compression molding is carried out under a pressure of the order of about 500 to 2000 kg/cm$^2$.

The non-oxidizing atmosphere is used in sintering to prevent the finely divided AlN powder from being oxidized on the surface.

The non-oxidizing atmosphere may be an inert gas such as nitrogen, argon and helium, hydrogen, carbon monoxide, various hydrocarbons, or mixtures of these gases. Vacuum atmosphere is also employable.

It is desirable that the non-oxidizing atmosphere contain nitrogen, and preferably at least 50% by volume of nitrogen with an inert gas such as argon and helium being optionally mixed.

The sintering may be conducted under ambient pressure which is atmospheric pressure or substantially atmospheric pressure, and usually, in a stream of nitrogen.

The sintering temperature ranges from about 1600° C. to about 1900° C., and most preferably, from about 1750° C. to about 1800° C. in order to effectively achieve sintering. If a temperature of lower than about 1600° C. is employed, the resulting sintered body is not fully densified even after an extended period of sintering. On the contrary, if the sintering temperature exceeds 1900° C., the aluminum nitride is found to vaporize off. At temperatures in excess of 1800° C., the oxygen contained in the body tends to form a solid-solution in the aluminum nitride, inducing a phonon scattering and hence, lowering thermal conductivity.

The sintering time is generally in the range from about 0.5 to 2 hours, and preferably, about one hour at 1750° C.

Hot pressing under a pressure of the order of 100 to 300 kg/cm$^2$ may be also employed to carry out the sintering process.

The aluminum nitride sintered article thus obtained exhibits good properties without uneven sintering, as demonstrated by a density of 90% or more of the theoretical density of aluminum nitride, an electrical resistivity of $10^{12}$ Ωcm or higher, and a thermal conductivity of 80 W/m·K or higher, all at room temperature. It has a coefficient of thermal expansion of about $5 \times 10^{-6}$.

Although conventional aluminum nitride sintered bodies have an electrical resistivity with variations ranging from 10 to 20%, the sintered body of the present invention has an electrical resistivity with only about 1% variation due to its substantially uniform sintering.

The sintered aluminum nitride body of the present invention is of high quality without uneven sintering because it comprises aluminum nitride in admixture with at least one sintering aid selected from the group consisting of nitrides and hydrides of calcium, strontium and barium, and is formed by adding the sintering aid to the powder aluminum nitride in amounts of 0.01 to 10% by weight of the aluminum nitride, molding the mixture into a compact and sintering the compact in a non-oxidizing atmosphere.

The sintered aluminum nitride body of this invention has further advantages of high density, thermal conductivity and dielectric strength. In addition to these good sintering properties without uneven sintering, the sintered aluminum nitride body of this invention exhibits good adhesion to silicon chips and little variation in electrical resistivity, possessing every character suitable for use as electrical insulating substrates for integrated circuits and other heat dissipating substrates.

Since the method of this invention employs sintering under ambient pressure, the sintered aluminum nitride body can be produced in a simple manner at low cost.

The sintered body of aluminum nitride according to the present invention is not particularly limited in shape and size, and may take any desired form including thin and thick plates and discs.

EXAMPLES

In order that those skilled in the art will better understand how to practice the present invention, examples are given below by way of illustration and not by way of limitation.

Example 1

To aluminum nitride powder having an average particle size of 5 μm was added CaH$_2$ powder having an average particle size of 10 μm in an amount of 0.1% by weight of the AlN powder. The mixture was fully milled and then molded into a compact under a pressure of 1000 kg/cm$^2$ at room temperature.

The compact was heated to 1750° C. in a stream of nitrogen, maintained at 1750° C. for one hour, and thereafter furnace cooled to room temperature. The thus sintered AlN body is designated Sample 11.

Sample 12 was also prepared by the same procedure as Sample 11 except that CaH$_6$ powder was added in amounts of 2.0 by weight of the AlN powder, respectively.

For comparison, samples were prepared by the same procedure as Sample 11 except that calcium carbonate (CaCO$_3$) was added as the sintering aid in amounts of 0.1, 0.5 and 1.0% by weight of the AlN powder. These comparative samples are designated Samples 51, 52 and 53, respectively.

Another sample was prepared by the same procedure as Sample 11 except that yttria (Y$_2$O$_3$) was added to AlN powder as the sintering aid in an amount of 1.0% by weight of the AlN powder. This is designated Sample 61.

In the same way, sample 71 was prepared by adding 3% by weight of boron nitride (BN) to AlN powder.

Samples 11, 12, 51 to 53, 61 and 71 were measured for the following properties. The results are shown in Table 1.

(1) Density and relative density

Actual density of a sample was measured by a conventional method. Relative density is the actual density divided by the theoretical density.

(2) Electric resistivity and its variation

Ag paste was applied and baked to either surface of a sample in the form of a disc of 30 mm diameter and 2 mm thick to form electrodes. Ten specimens for each group were measured for electric resistivity at a temperature of 23° C. and a relative humidity of 50%. An average value was calculated therefrom. The range between the maximum and the minimum resistivity is also shown in Table 1.

(3) Thermal conductivity

The same disc sample as used in resistivity measurement (2) was measured for thermal conductivity at room temperature except that the Ag paste was omitted herein.

(4) Unevenly sintered area

The area of short sintering appearing as white spots on a sample was determined.

TABLE 1

| Sample No. | Sintering aid (wt %) | | Density g/cm³ | Relative density % | Thermal conductivity W/m · K | Electric resistivity Ωcm | Range of electric resistivity | Unevenly sintered area % |
|---|---|---|---|---|---|---|---|---|
| 11 | CaH$_2$ | (0.1) | 3.20 | 98.2 | 95 | $1 \times 10^{13}$ | $1-2 \times 10^{13}$ | 1 |
| 12 | CaH$_2$ | (2.0) | 3.26 | 100 | 180 | $8 \times 10^{13}$ | $2-5 \times 10^{13}$ | 0 |
| 51* | CaCO$_3$ | (0.1) | 2.61 | 80 | — | — | — | — |
| 52* | CaCO$_3$ | (0.5) | 3.20 | 98.2 | 60 | $5 \times 10^{13}$ | $0.9-8 \times 10^{13}$ | 10 |
| 53* | CaCO$_3$ | (1.0) | 3.16 | 96.9 | 85 | $2 \times 10^{13}$ | $1-5 \times 10^{13}$ | 6 |
| 61* | Y$_2$O$_3$ | (1.0) | 3.30 | 100 | 100 | $3 \times 10^{13}$ | $0.2-6 \times 10^{13}$ | 30 |
| 71* | BN | (3) | 2.35 | 72.1 | — | — | — | — |

*comparative examples

Example 2

To aluminum nitride powder having an average particle size of 3 μm was added various sintering aids of the present invention as specified in Table 2, each in the form of powder having an average particle size of 10 μm and in an amount of 2% by weight of the AlN powder. Each mixture was fully milled and then molded into a compact under a pressure of 1000 kg/cm² at room temeprature.

The compact was heated to 1750° C. in a stream of nitrogen, maintained at 1750° C. for one hour, and thereafter furnace cooled to room temperature. The thus sintered AlN bodies are designated Samples 111 and 112 employing as the sintering aids BaH$_2$ and SrH$_2$, respectively, Samples 121 and 122 employing Ca$_3$N$_2$ and Ba$_3$N$_2$, respectively.

For comparison, additional samples were prepared by the same procedure except that calcium carbonate (CaCO$_3$) was added as the sintering aid in amounts of 0.1, 0.5 and 1.0% by weight of the AlN powder. These comparative samples are designated Samples 151, 152 and 153, respectively.

Using the same procedure, Sample 161 was prepared by adding 1.0% by weight of yttria (Y$_2$O$_3$), Sample 171 was prepared by adding 3% by weight of boron nitride (BN), and Samples 113 and 131 were prepared by adding MgH$_2$ and Mg each in an amount of 2% by weight of the AlN powder, respectively.

These samples of the present invention and the comparative examples were measured for the same properties as in Example 1. The results are shown in Table 2.

or short sintered area and thus exhibits consistent electric resistivity among a number of products. Good results were also obtained in density, thermal conductivity and electric resistance. Because of these characteristics, the sintered aluminum nitride body of this invention is desirable for use as electrical insulating substrates.

Samples 51, 71, 113, 131, 151 and 171 showed low density and practically unacceptable properties.

These data apparently show the benefits of the present invention.

Sintered aluminum nitride body of this invention also were resistant to thermal cycling when applied as electrical insulating substrates for use in semiconductor power modules.

Magnesium compounds were found to be less effective.

What is claimed is:

1. A sintered aluminum nitride body prepared by sintering aluminum nitride in admixture with a sintering aid selected from the group consisting of nitrides and hydrides of calcium, strontium and barium, and mixtures thereof.

2. A sintered aluminum nitride body according to claim 1 wherein the aluminum nitride and the sintering aid are mixed both in the form of powder, and the sintering aid is added in amounts of 0.01 to 10% by weight of the aluminum nitride.

3. A sintered aluminum nitride body according to claim 1 wherein the aluminum nitride is sintered in a non-oxidizing atmosphere.

4. A sintered aluminum nitride body according to claim 1 further having a thermal conductivity of at least 80 W/m·K.

5. A sintered aluminum nitride body according to claim 1 further having a relative density of at least 90%.

6. A sintered aluminum nitride body according to claim 1 further having a volume resistivity of at least $10^{12}$ Ωcm.

TABLE 2

| Sample No. | Sintering aid (wt %) | | Density g/cm³ | Relative density % | Thermal conductivity W/m · K | Range of electrical resistivity | Unevenly sintered area % |
|---|---|---|---|---|---|---|---|
| 111 | BaH$_2$ | (2) | 3.19 | 97.9 | 120 | $2-5 \times 10^{12}$ | 0 |
| 112 | SrH$_2$ | (2) | 3.20 | 98.2 | 120 | $1-7 \times 10^{12}$ | 0 |
| 113* | MgH$_2$ | (2) | 1.82 | 55.8 | — | — | — |
| 121 | Ca$_3$N$_2$ | (2) | 3.23 | 99.1 | 140 | $2-5 \times 10^{12}$ | 0 |
| 122 | Ba$_3$N$_2$ | (2) | 3.21 | 98.5 | 120 | $3-5 \times 10^{12}$ | 0 |
| 131* | Mg | (2) | 1.85 | 56.7 | — | — | — |
| 151* | CaCO$_3$ | (0.1) | 2.61 | 80 | — | — | — |
| 152* | CaCO$_3$ | (0.5) | 3.20 | 98.2 | 60 | $0.9-8 \times 10^{13}$ | 10 |
| 153* | CaCO$_3$ | (1.0) | 3.16 | 96.9 | 85 | $1-5 \times 10^{13}$ | 6 |
| 161* | Y$_2$O$_3$ | (1.0) | 3.30 | 100 | 100 | $0.2-6 \times 10^{13}$ | 30 |
| 171* | BN | (3) | 2.35 | 72.1 | — | — | — |

*comparative examples

As seen from Tables 1 and 2, the sintered aluminum nitride body of this invention contains a less unevenly

* * * * *